United States Patent
DeJana et al.

(10) Patent No.: US 8,972,941 B2
(45) Date of Patent: Mar. 3, 2015

(54) INTEGRATED DEVELOPMENT ENVIRONMENT-BASED WORKLOAD TESTING IN A NETWORKED COMPUTING ENVIRONMENT

(75) Inventors: Ryan G. DeJana, Longmont, CO (US); Lisa Seacat DeLuca, San Francisco, CA (US); Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 13/551,823

(22) Filed: Jul. 18, 2012

(65) Prior Publication Data
US 2014/0026119 A1 Jan. 23, 2014

(51) Int. Cl.
*G06F 9/44* (2006.01)
(52) U.S. Cl.
USPC .............................. 717/124; 709/203; 709/226
(58) Field of Classification Search
None
See application file for complete search history.

(56) References Cited

U.S. PATENT DOCUMENTS

| | | | |
|---|---|---|---|
| 6,247,020 B1* | 6/2001 | Minard | 1/1 |
| 7,127,707 B1* | 10/2006 | Mishra et al. | 717/137 |
| 7,631,006 B2* | 12/2009 | Hagstrom et al. | 1/1 |
| 7,996,525 B2 | 8/2011 | Stienhans et al. | |
| 8,037,415 B1* | 10/2011 | Landivar | 715/734 |
| 8,122,282 B2 | 2/2012 | Betzler et al. | |
| 8,336,026 B2* | 12/2012 | Chaar et al. | 717/113 |
| 2006/0259506 A1* | 11/2006 | Kim | 707/102 |
| 2009/0077091 A1* | 3/2009 | Khen et al. | 707/10 |
| 2010/0042670 A1* | 2/2010 | Kamalakantha et al. | 709/203 |
| 2011/0126197 A1* | 5/2011 | Larsen et al. | 718/1 |
| 2011/0191753 A1* | 8/2011 | Ghercioiu et al. | 717/132 |
| 2011/0276686 A1* | 11/2011 | Tung et al. | 709/224 |
| 2011/0314466 A1* | 12/2011 | Berg et al. | 718/1 |
| 2012/0030515 A1* | 2/2012 | Birakoglu et al. | 714/38.1 |
| 2012/0192197 A1* | 7/2012 | Doyle et al. | 718/103 |
| 2012/0204187 A1* | 8/2012 | Breiter et al. | 718/105 |
| 2012/0290725 A1* | 11/2012 | Podila | 709/226 |
| 2013/0007704 A1* | 1/2013 | Haynes et al. | 717/120 |
| 2013/0086235 A1* | 4/2013 | Ferris | 709/223 |
| 2013/0263090 A1* | 10/2013 | Polk et al. | 717/124 |

OTHER PUBLICATIONS

Maitland, J., "Keeping Control Isn't Easy", Chapter 4: Cloud-Based Infrastructure, SearchCloudComputing.com, 13 pages, 2012.

(Continued)

*Primary Examiner* — Don Wong
*Assistant Examiner* — Roberto E Luna
(74) *Attorney, Agent, or Firm* — William E. Schiesser; Hunter E. Webb; Keohane & D'Alessandro PLLC

(57) ABSTRACT

Embodiments of the present invention relate to an integrated development environment (IDE)-based approach for testing development projects (e.g., comprising one or more intended workloads). In a typical embodiment, a designation of a project (e.g. having a set of workloads) for testing on a network resource group is received via a user interface associated with an IDE. A current server instance in the network resource group having a highest availability for testing the project may then be identified (e.g., based on an analysis of various computing/cost characteristics). The project may then be deployed to the current server instance, and a network address corresponding to the current server instance may be associated with the project in a computer storage device. The project may then be tested by processing the set of intended workloads using the current server instance.

22 Claims, 8 Drawing Sheets

(56) References Cited

OTHER PUBLICATIONS

Mell et al., "The NIST Definition of Cloud Computing", National Institute of Standards and Technology, Information Technology Laboratory, Version 15, Oct. 7, 2009, 2 pages.

Turner, B., "High Availability—In the Cloud", TMCnet.com, Jul. 2009, 4 pages.

"Auto Scaling", Amazon Web Services, no authors cited, 2012, 5 pages.

"IBM SmartCloud Eclipse plugin", IBM, no authors cited, publication date not cited, 1 page, 2012.

"Popularity-Common Visited Bookmarks", FireFox, no authors cited, publication date not cited, 1 page, 2012.

\* cited by examiner

US 8,972,941 B2

INTEGRATED DEVELOPMENT ENVIRONMENT-BASED WORKLOAD TESTING IN A NETWORKED COMPUTING ENVIRONMENT

TECHNICAL FIELD

In general, embodiments of the present invention relate to workload/project testing. Specifically, embodiments of the present invention relate to integrated development environment (IDE)-based workload/project testing in a networked computing environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

One of the advantages of using a cloud computing deployment and development environment are the flexibility, reliability, and scalability features that a cloud environment may offer. For example, it may be possible to generate new instances of cloud resources for development, and to disengage the cloud resources when they are no longer needed. Oftentimes, there may be multiple resources (e.g., data centers) within a cloud environment that are available. Each such resource may have its own distinct advantages and/or disadvantages such as network speed, data transfer rate, cost, etc. Challenges may exist, however, in that it may be time consuming to manually examine and analyze such characteristics when identifying a resource instance for testing and/or processing projects/workloads.

SUMMARY

In general, embodiments of the present invention relate to an integrated development environment (IDE)-based approach for testing (e.g., development) projects (e.g., comprising one or more intended workloads). In a typical embodiment, a designation of a project (e.g. having a set of workloads) for testing on a network resource group is received via a user interface associated with an IDE. A current server instance in the network resource group having a highest availability for testing the project may then be identified (e.g., based on an analysis of various computing/cost characteristics). The project may then be deployed to the current server instance, and a network address corresponding to the current server instance may be associated with the project in a computer storage device. The project may then be tested by processing the set of intended workloads using the current server instance.

A first aspect of the present invention provides a computer-implemented method for testing workloads using an integrated development environment (IDE) in a networked computing environment, comprising: receiving a designation of a project for testing on a network resource group via a user interface associated with the IDE, the project comprising a set of intended workloads; and identifying a current server instance in the network resource group having a highest availability for testing the project.

A second aspect of the present invention provides a system for testing workloads using an integrated development environment (IDE) in a networked computing environment, comprising: a memory medium comprising instructions; a bus coupled to the memory medium; and a processor coupled to the bus that when executing the instructions causes the system to: receive a designation of a project for testing on a network resource group via a user interface associated with the IDE, the project comprising a set of intended workloads; identify a current server instance in the network resource group having a highest availability for testing the project; and deploy the project to the current server instance.

A third aspect of the present invention provides a computer program product for testing workloads using an integrated development environment (IDE) in a networked computing environment, the computer program product comprising a computer readable storage media, and program instructions stored on the computer readable storage media, to: receive a designation of a project for testing on a network resource group via a user interface associated with the IDE, the project comprising a set of intended workloads; identify a current server instance in the network resource group having a highest availability for testing the project; and deploy the project to the current server instance.

A fourth aspect of the present invention provides a method for deploying a system for testing workloads using an integrated development environment (IDE) in a networked computing environment, comprising: providing a computer infrastructure being operable to: receive a designation of a project for testing on a network resource group via a user interface associated with the IDE, the project comprising a set of intended workloads; identify a current server instance in the network resource group having a highest availability for testing the project; deploy the project to the current server instance; associate a network address corresponding to the current server instance with the project in a computer storage device; and test the project by processing the set of intended workloads using the current server instance.

BRIEF DESCRIPTION OF THE DRAWINGS

These and other features of this invention will be more readily understood from the following detailed description of the various aspects of the invention taken in conjunction with the accompanying drawings in which.

Figure 1:
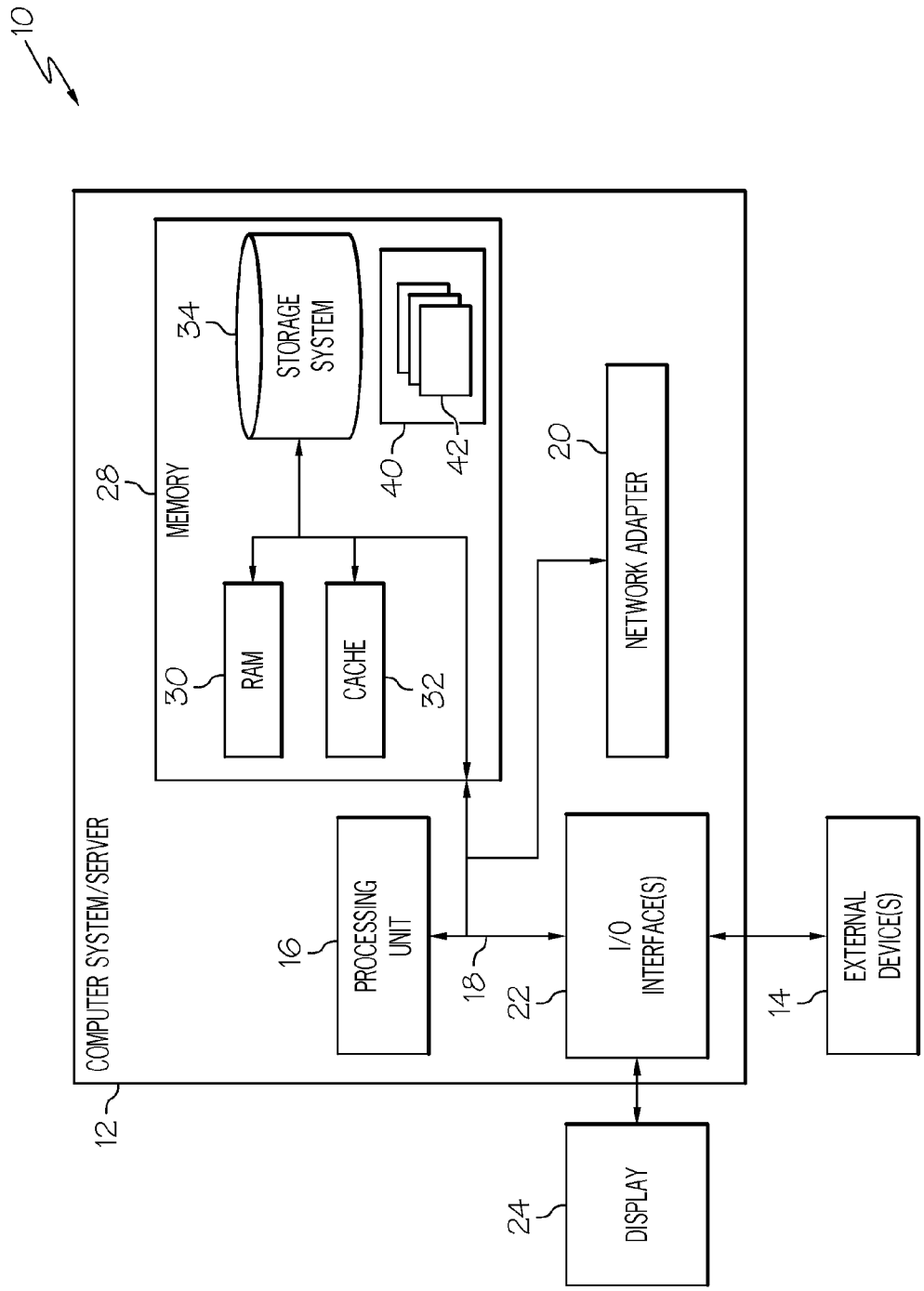
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention relate to an integrated development environment (IDE)-based approach for testing development projects (e.g., comprising one or more intended workloads). In a typical embodiment, a designation of a project (e.g. having a set of workloads) for testing on a network resource group is received via a user interface associated with an IDE. A current server instance in the network resource group having a highest availability for testing the project may then be identified (e.g., based on an analysis of various computing/cost characteristics). The project may then be deployed to the current server instance, and a network address corresponding to the current server instance may be associated with the project in a computer storage device. The project may then be tested by processing the set of intended workloads using the current server instance.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
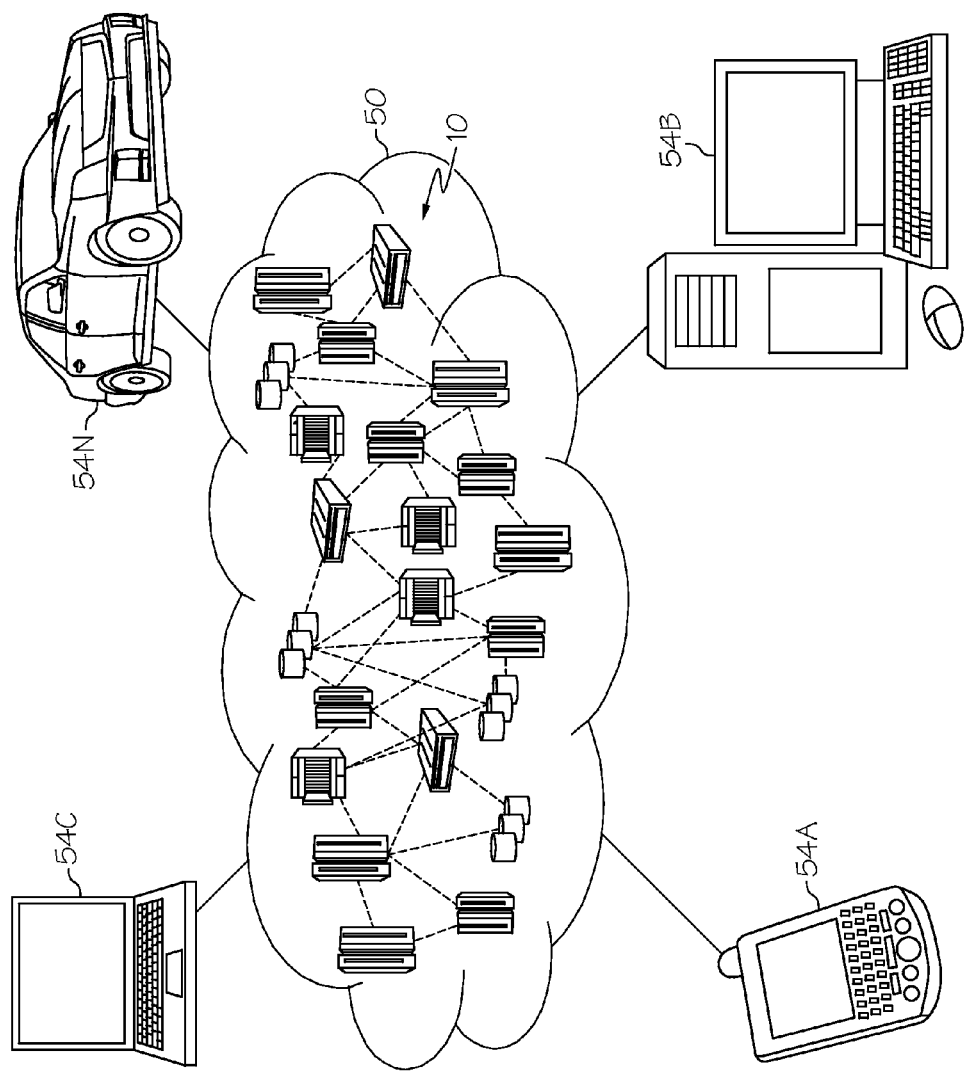
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
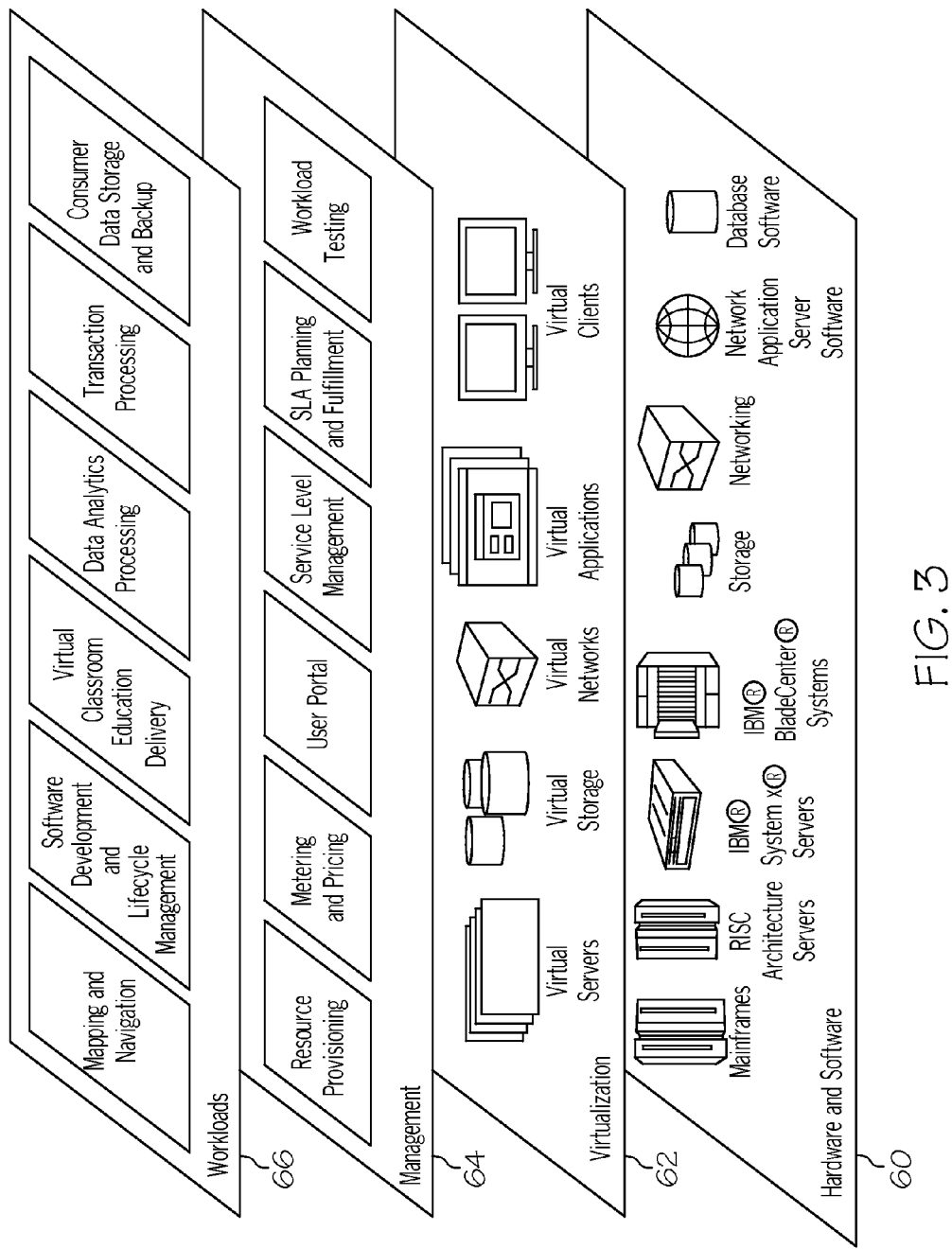
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is workload testing, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the workload testing functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
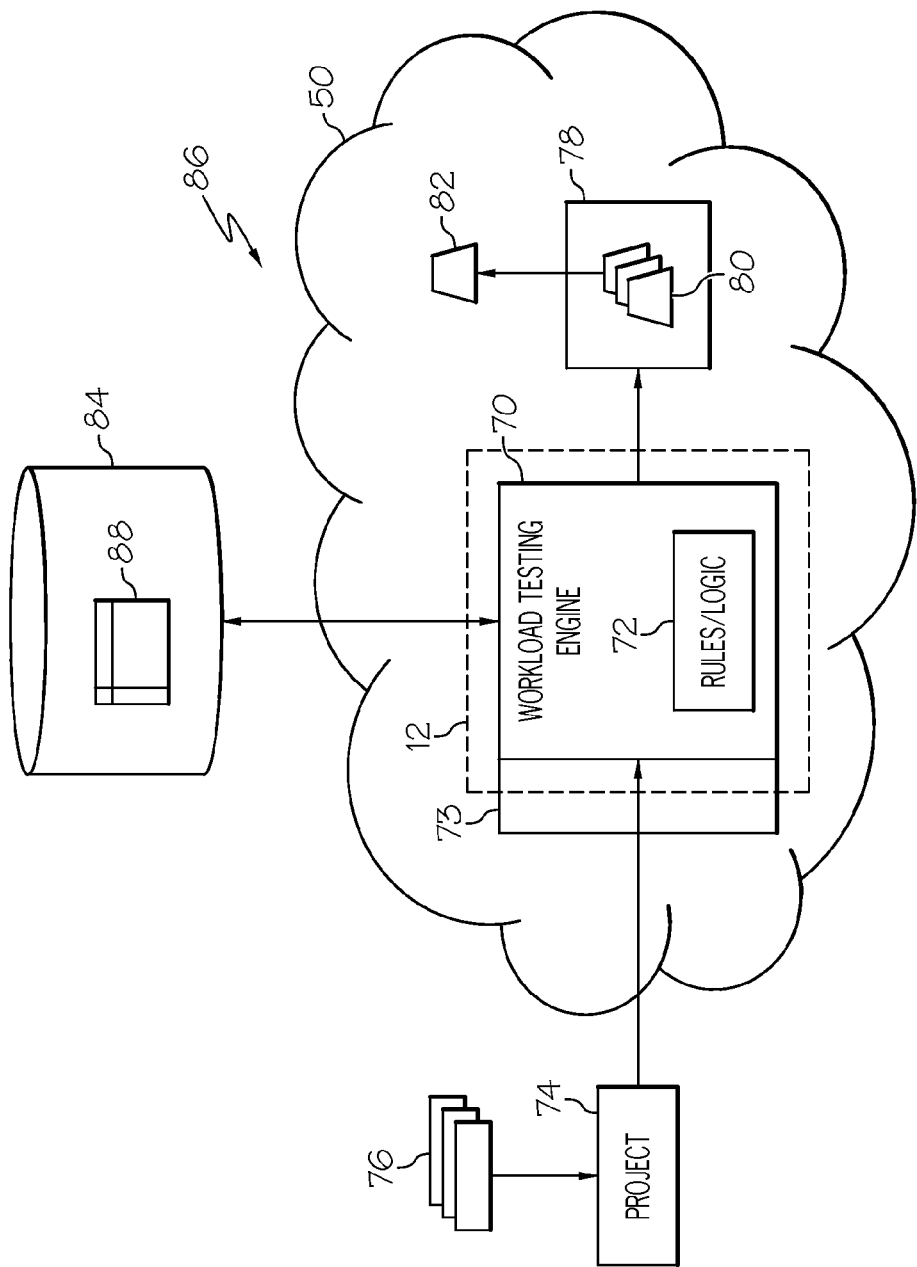
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A computer system/server 12, which can be implemented as either a stand-alone computer system or as a networked computer system, is shown in FIG. 4. In the event the teachings recited herein are practiced in a networked computing environment 86, each client need not have a workload/project testing engine (engine 70). Rather, engine 70 could be loaded on a server or server-capable device that communicates (e.g., wirelessly) with the clients to provide workload/project testing therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides workload/project testing hereunder.

Along these lines, engine 70 may perform multiple functions similar to a general-purpose computer. Specifically, among other functions, engine 70 may (among other things): receive a designation of a project 74 (e.g., comprising a set of intended workloads 76) for testing on a network resource group 78 (comprising a set of server instances 80, etc.) via a user interface (e.g., comprising a set of fields for graphically assigning the project to the network resource group) associated with an IDE 73 (IDE 73 may be implemented in any fashion now known or later developed. For example, IDE 73 may be implemented inside or outside of cloud environment 50, on computer system/server 12, on a computerized device local to a user, etc. As such, the implementation shown in FIG. 4 is intended to be illustrative only to; identify a current server instance 82 in the network resource group 78 having a highest availability (e.g., based on an available processor utilization level, an available storage utilization level, an available network bandwidth, an available cost level, etc.) for testing the project 74; deploy/assign the project 74 to the current server instance 82 (e.g., redeploy/reassign the project from a previous server instance to the current server instance based on the highest availability); associate a network address corresponding to the current server instance with the project in a computer storage device 84 (e.g., in a table 88 or the like); re-assign the project to a different server instance responsive to a change in the highest availability of the current server instance; re-associate the project with the different server instance in the computer storage device; and test the project 74 by processing the set of intended workloads 76 using the current server instance 82.

It is understood that the user interfaces provided hereunder may be accessed by a user via an IDE. As such, engine 50 may work in conjunction with and/or augment existing IDEs to provide such interfaces and the functionality described herein.

Illustrative Example

Figure 5:
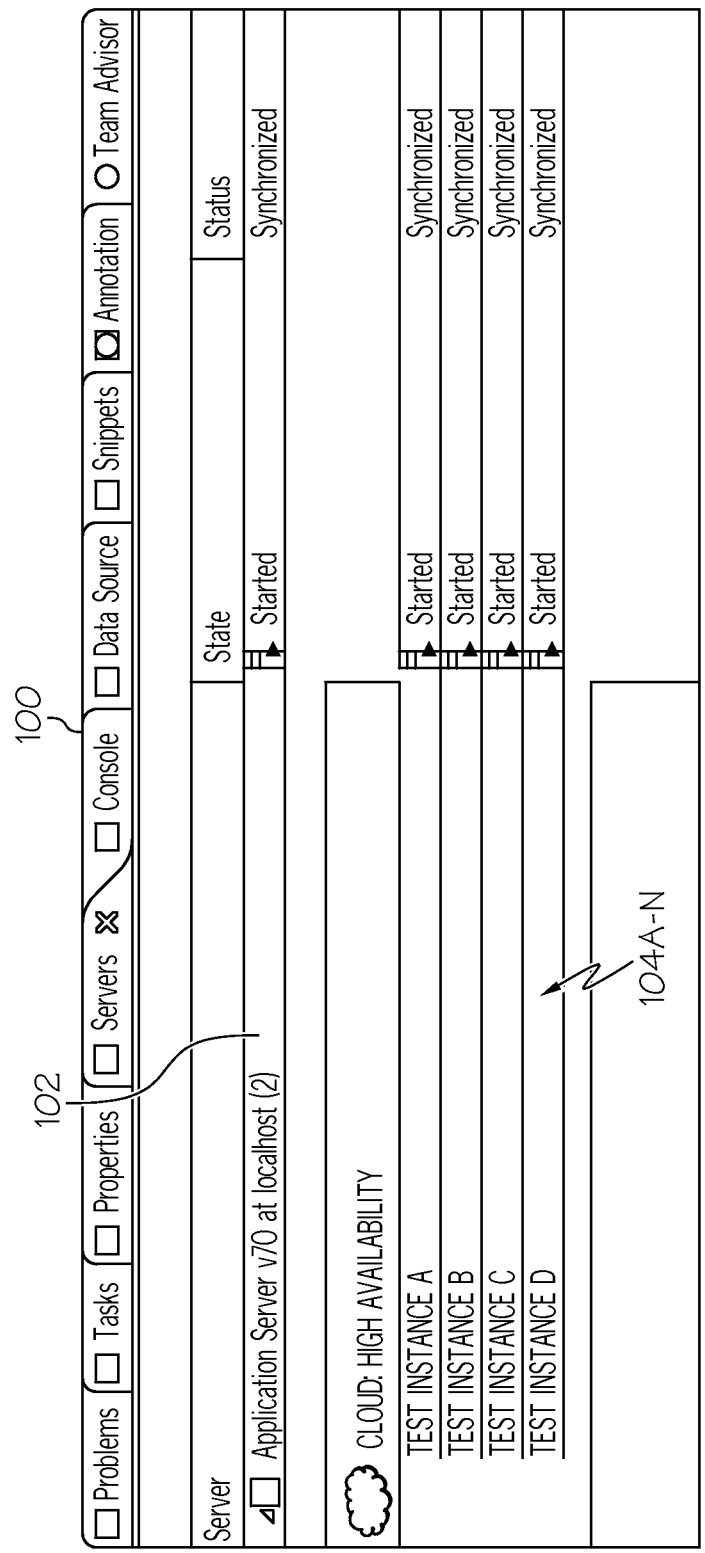
FIG. 5 depicts a first user interface according to an embodiment of the present invention.
Figure 6:
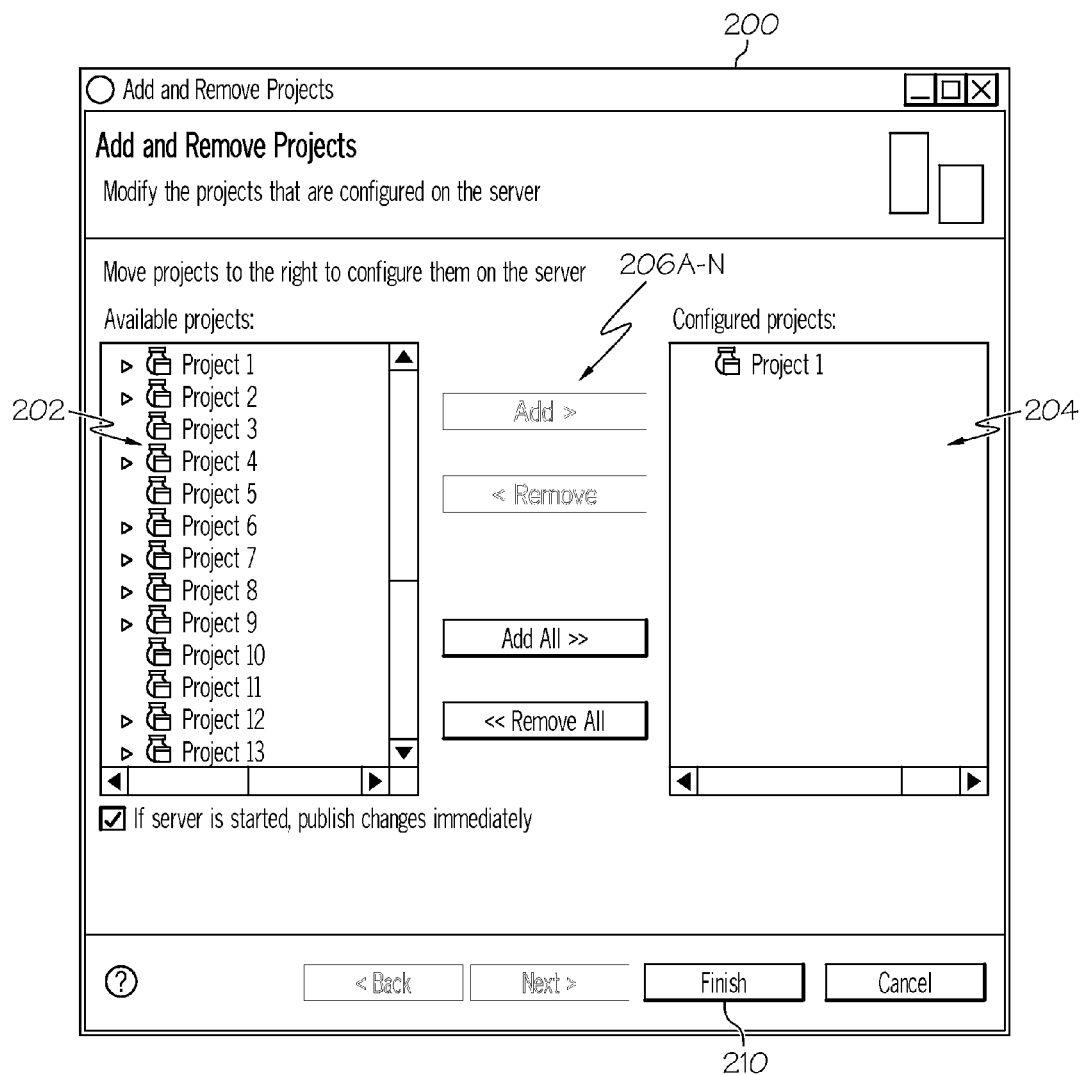
FIG. 6 depicts a second user interface according to an embodiment of the present invention.

The following section describes at least one embodiment of the present invention according to one possible implementation. It is understood that the general teachings recited here are not intended to be limited to the specific user interfaces/example set forth in this section. In any event, in one possible implementation, the following may be performed:

1. A user interacts with an IDE.
2. When the user is ready to test a project in a cloud environment (e.g., on a particular cloud group), the user will "add" the project to the cloud group rather than a specific server. An example of this is shown in FIG. 5. As depicted, a user interface 100 may be provided hereunder by IDE 72 and/or engine 50. User interface 100 may generally display a particular networked computing resource such as a server group 102, as well as specific server instances 104A-N associated with the server group 102. When a server group 102 is selected, an additional user interface may be presented to the user. As shown in FIG. 6, user interface 200 may comprise a project field/list 202 showing all project associated with the user. Using buttons 206A-N, the user may add one or more projects in list 202 to a configured (to be tested) project field/list 204. Upon so doing, the user may then select button 210 to indicate that the added project(s) will be tested on a highest available server instance of the set of server instances 104A-N for server group 102 displayed in user interface 100.
3. Specifically, when the project(s) are added to the "to be tested" list 204, the project(s) are redeployed to a server instance in the cloud group that has a highest availability, and/or to a set of server instances in the cloud that have the highest availability. As indicated above, the highest availability could be based on any type of factor such as available processing capacity, available memory capacity, available network bandwidth, cost, etc.
4. The user's host file may be changed to allow the user to continue testing the project without the need to determine the hostname or Internet Protocol (IP) address of the server instance. For example:
   1. The host entry may be based on the name of the cloud group (e.g., 111.222.33.4 cloud_highavailability.test.com); and/or
   2. As the IDE chooses/deploys the application to a new cloud resource, the host name may be updated (e.g., 111.222.33.4 cloud_highavailability.test.com).
5. As the availability of the cloud resources change:
   1. The projects may be removed from the first server instance and redeployed onto a higher availability server instance.
   2. An alert may be shown to the user asking if the user would like to deploy to the higher availability server.
   3. The order to the servers within the cloud group may be reordered.
   4. The system may check for testing activity on the currently deployed server. If there is none, proceed with project removal. If there is activity, the system might prompt the user or ignore the new higher availability server.
6. When the user is done testing, the user may choose to remove the project from some or all of the server instances to which the project was deployed for testing.

Figure 7:
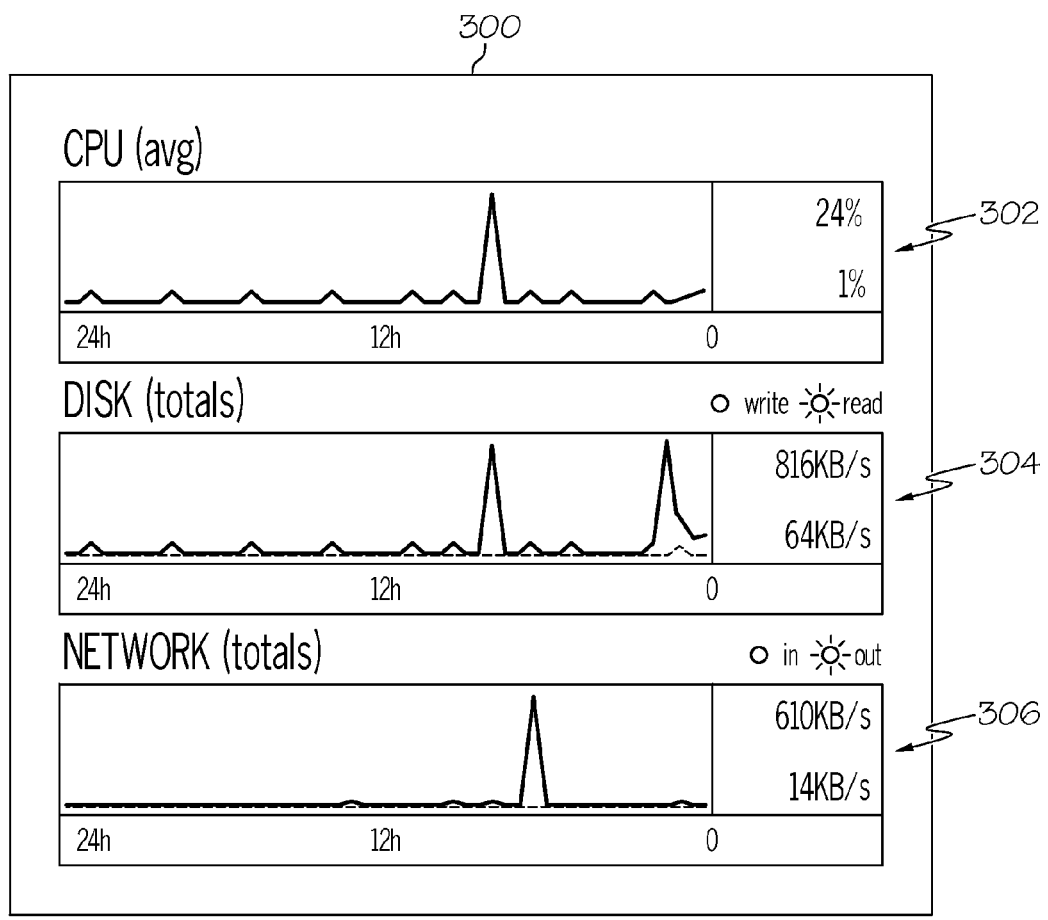
FIG. 7 depicts a display for a resource monitoring application according to an embodiment of the present invention.

The process of determining high availability servers may be done through a set of available APIs and services used to monitor network status. As example of a display 300 (e.g., provided by engine and/or a counterpart application (such as a smart phone application) that monitors server instance resource availability and consumption is shown in FIG. 7. As depicted, the display may provide information such as: a graph 302 pertaining to CPU consumption/availability; a graph 304 pertaining to storage/memory consumption/availability; and/or a graph 306 pertaining to network bandwidth consumption/availability.

Figure 8:
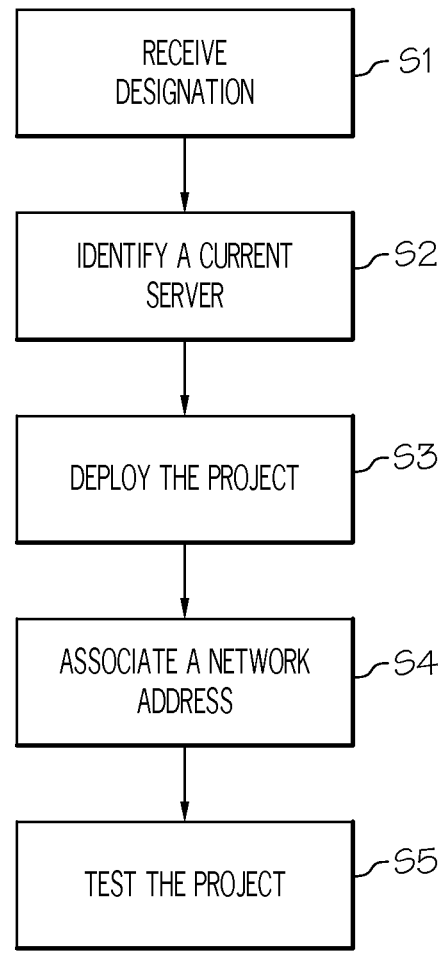
FIG. 8 depicts a method flow diagram according to an embodiment of the present invention.

Referring now to FIG. 8, a method flow diagram according to an embodiment of the present invention is shown. In step S1, a designation of a project for testing on a network resource group (e.g., comprising a set of server instances) via a user interface (e.g., comprising a set of fields for graphically assigning the project to the network resource group) associated with an IDE is received. As indicated, the project may comprise a set of intended workloads. In step S2, a current server instance having a highest availability for testing the project is identified (e.g., based on an available processor utilization level, an available storage utilization level, an available network bandwidth, etc.) in the network resource group. In step S3, the project is assigned and deployed to the current server instance (e.g., reassigned the project from a previous server instance). In step S4, a network address corresponding to the current server instance is associated with the project in a computer storage device. In step S5, the project is tested by processing the set of intended workloads using the current server instance.

While shown and described herein as an IDE-based workload testing solution, it is understood that the invention further provides various alternative embodiments. For example, in one embodiment, the invention provides a computer-readable/useable medium that includes computer program code to enable a computer infrastructure to provide IDE-based workload testing functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide IDE-based workload testing functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for IDE-based workload testing. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for testing workloads using an integrated development environment (IDE) in a networked computing environment, comprising:
providing a display of a set of projects being developed by a user in a natural user interface of the IDE;
receiving a designation of a project of the set of projects for testing on a network resource group via a user interface integrated with the natural user interface of the IDE, the project comprising a set of intended workloads;
identifying a current server instance in the network resource group having a highest immediate availability for testing the project, the identifying including how quickly the current server instance can be instantiated;
deploying, in response to the identifying, the project to the current server instance, and
changing a name by which the project is accessed via the user interface by associating a network address corresponding to the current server instance with the project in a computer storage device.

2. The computer-implemented method of claim 1, the networked computing environment comprising a cloud computing environment, and the network resource group comprising a cloud resource group.

3. The computer-implemented method of claim 1, comprising reassigning the project from a previous server instance to the current server instance based on the highest availability.

4. The computer-implemented method of claim 1, the highest availability being based on at least one of the following: an available processor utilization level, an available storage utilization level, an available network bandwidth or an available cost level.

5. The computer-implemented method of claim 1, the user interface comprising a set of fields for graphically assigning the project to the network resource group.

6. The computer-implemented method of claim 1, further comprising:
re-assigning the project to a different server instance responsive to a change in the highest availability of the current server instance; and
re-associating the project with the different server instance in the computer storage device.

7. The computer-implemented method of claim 1, further comprising:
testing the project by processing the set of intended workloads using the current server instance.

8. A system for testing workloads using an integrated development environment (IDE) in a networked computing environment, comprising:
a memory medium comprising instructions;
a bus coupled to the memory medium; and
a processor coupled to the bus that when executing the instructions causes the system to:
provide a display of a set of projects being developed by a user in a natural user interface of the IDE;
receive a designation of a project of the set of projects for testing on a network resource group via a user interface integrated with the natural user interface of the IDE, the project comprising a set of intended workloads;
identify a current server instance in the network resource group having a highest immediate availability for testing the project, the identifying including how quickly the current server instance can be instantiated;
deploy, in response to the identifying, the project to the current server instance; and
changing a name by which the project is accessed via the user interface by associating a network address corresponding to the current server instance with the project in a computer storage device.

9. The system of claim 8, the networked computing environment comprising a cloud computing environment, and the network resource group comprising a cloud resource group.

10. The system of claim 8, the memory medium further comprising instructions for causing the system to reassign the project from a previous server instance to the current server instance based on the highest availability.

11. The system of claim 8, the highest availability being based on at least one of the following: an available processor utilization level, an available storage utilization level, an available network bandwidth, or an available cost level.

12. The system of claim 8, the user interface comprising a set of fields for graphically assigning the project to the network resource group.

13. The system of claim 8, the memory medium further comprising instructions for causing the system to:
   re-assign the project to a different server instance responsive to a change in the highest availability of the current server instance; and
   re-associate the project with the different server instance in the computer storage device.

14. The system of claim 8, the memory medium further comprising instructions for causing the system to:
   test the project by processing the set of intended workloads using the current server instance.

15. A computer program product for testing workloads using and integrated development environment (IDE) in a networked computing environment, the computer program product comprising a non-transitory computer readable media, and program instructions stored on the computer readable storage media, to:
   provide a display of a set of projects being developed by a user in a natural user interface of the IDE;
   receive a designation of a project of the set of projects for testing on a network resource group via a user interface integrated with the natural user interface of the IDE, the project comprising a set of intended workloads;
   identify a current server instance in the network resource group having a highest immediate availability for testing the project, the identifying including how quickly the current server instance can be instantiated;
   deploy, in response to the identifying, the project to the current server instance; and
   changing a name by which the project is accessed via the user interface by associating a network address corresponding to the current server instance with the project in a computer storage device.

16. The computer program product of claim 15, the networked computing environment comprising a cloud computing environment, and the network resource group comprising a cloud resource group.

17. The computer program product of claim 15, the computer readable storage media further comprising instructions to reassign the project from a previous server instance to the current server instance based on the highest availability.

18. The computer program product of claim 15, the highest availability being based on at least one of the following: an available processor utilization level, an available storage utilization level, or an available network bandwidth.

19. The computer program product of claim 15, the user interface comprising a set of fields for graphically assigning the project to the network resource group.

20. The computer program product of claim 15, the computer readable storage media further comprising instructions to:
   re-assign the project to a different server instance responsive to a change in the highest availability of the current server instance; and
   re-associate the project with the different server instance in the computer storage device.

21. The computer program product of claim 15, the computer readable storage media further comprising instructions to:
   test the project by processing the set of intended workloads using the current server instance.

22. A method for deploying a system for testing workloads using an integrated development environment (IDE) in a networked computing environment, comprising:
   providing a computer infrastructure being operable to:
      provide a display of a set of projects being developed by a user in a natural user interface of the IDE;
      receive a designation of a project of the set of projects for testing on a network resource group via a user interface integrated with the natural user interface of the IDE, the project comprising a set of intended workloads;
      identify a current server instance in the network resource group having a highest immediate availability for testing the project, the identifying including how quickly the current server instance can be instantiated;
      deploy, in response to the identifying, the project to the current server instance;
      associate a network address corresponding to the current server instance with the project in a computer storage device;
      test the project by processing the set of intended workloads using the current server instance; and
      changing a name by which the project is accessed via the user interface by associating a network address corresponding to the current server instance with the project in a computer storage device.

* * * * *